No. 697,067. Patented Apr. 8, 1902.
A. R. BLACK.
SULKY HAY RAKE.
(Application filed July 8, 1901.)
(No Model.) 3 Sheets—Sheet 1.
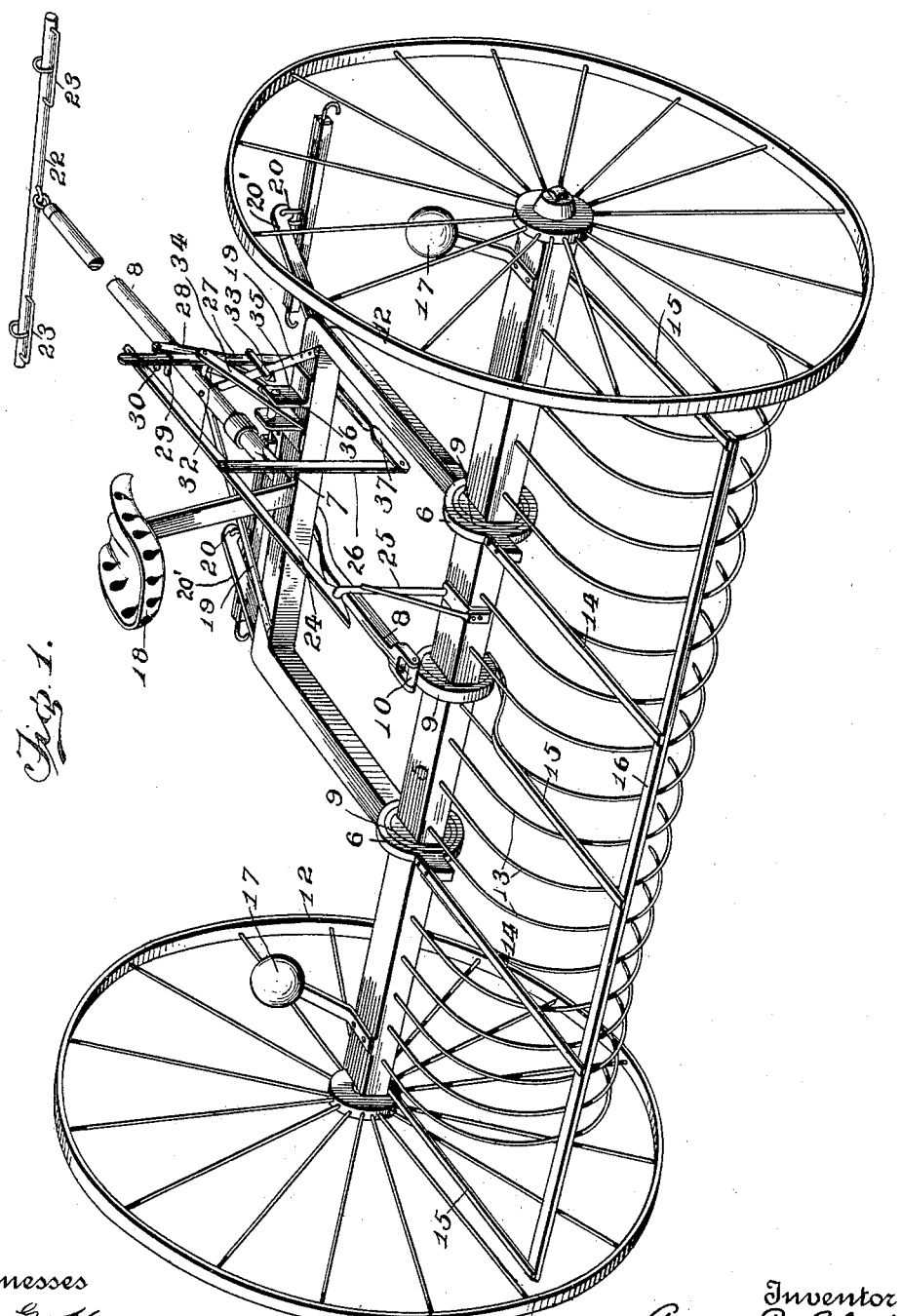
Witnesses
L. G. Handy.
Ralph F. Warfield.
Inventor
Amos R. Black
by
Geo. S. Laculie
his Attorney

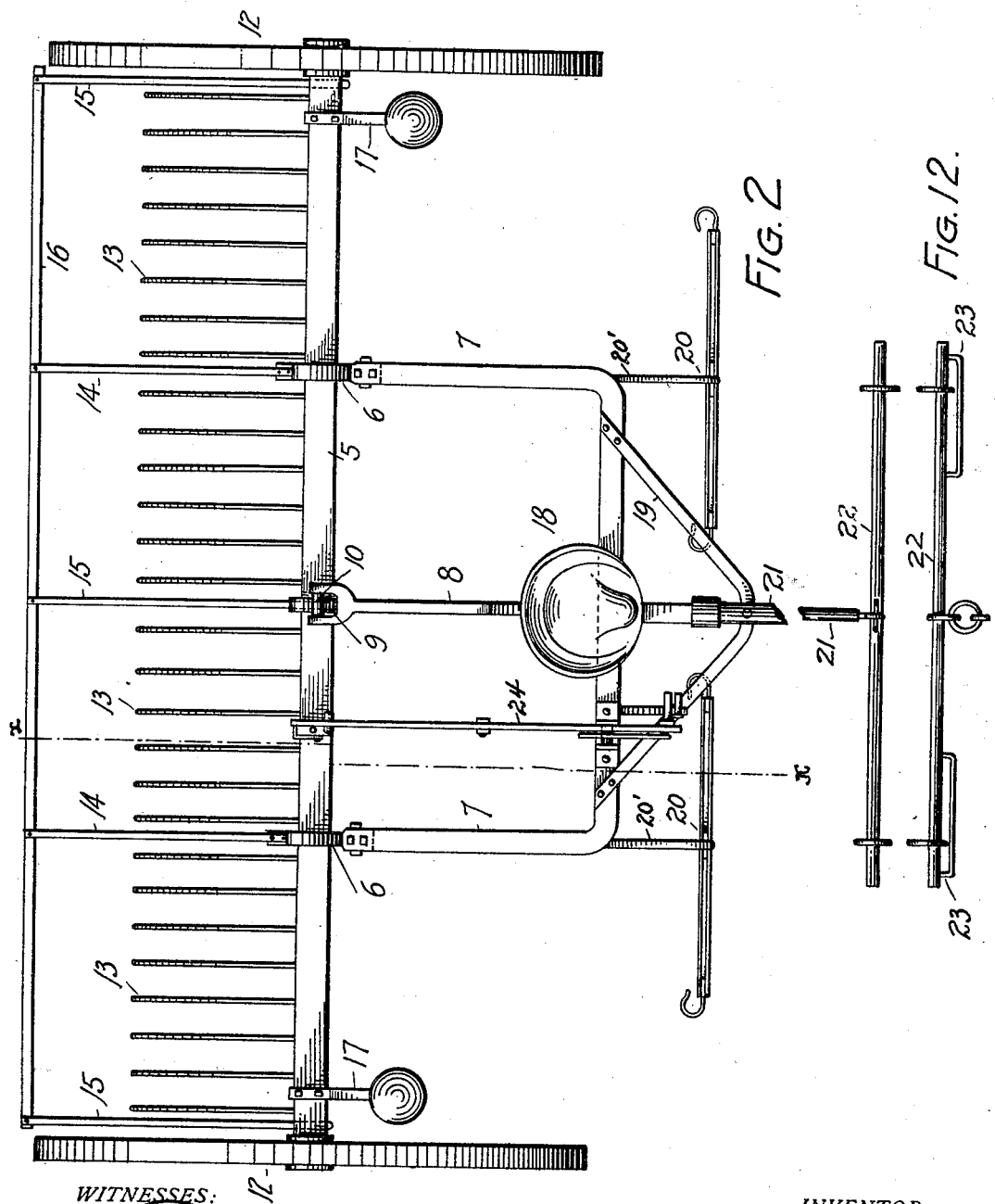

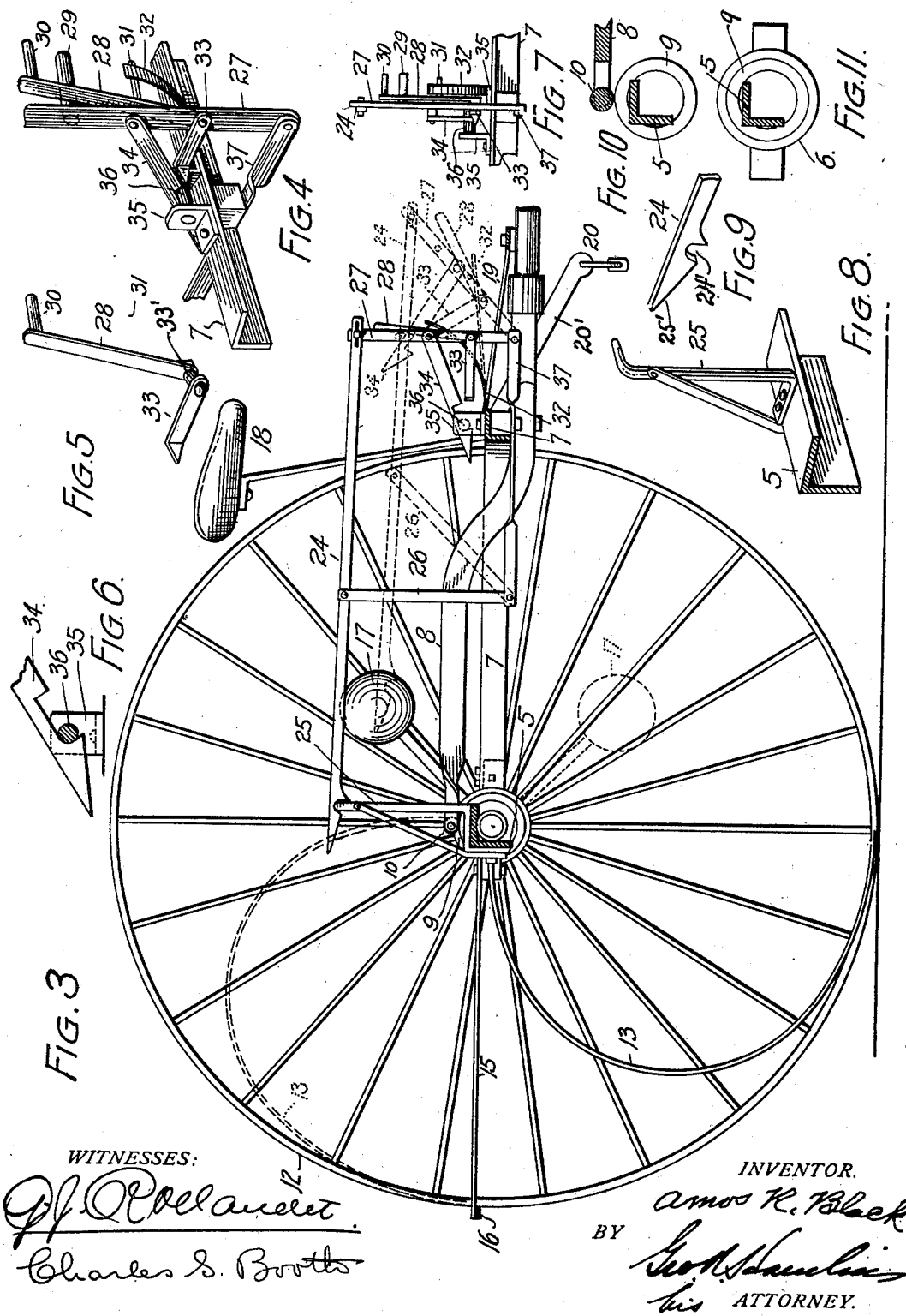

UNITED STATES PATENT OFFICE.

AMOS R. BLACK, OF LAMAR, COLORADO.

SULKY HAY-RAKE.

SPECIFICATION forming part of Letters Patent No. 697,067, dated April 8, 1902.

Application filed July 8, 1901. Serial No. 67,507. (No model.)

*To all whom it may concern:*

Be it known that I, AMOS R. BLACK, a citizen of the United States, residing at Lamar, county of Prowers, State of Colorado, have invented certain new and useful Improvements in Sulky Hay-Rakes, of which the following is a specification.

This invention relates to sulky hay-rakes.

My object is to provide a sulky hay-rake of novel and improved construction in which the wheels will be relieved of all strain during the dumping operation and wherein all side strain or pressure on the pole will be avoided.

A further object is to prevent "thrashing" of the rake-teeth and their falling heavily to the ground.

Another object is the provision of a sulky-rake in which manual work by the driver will be reduced to a minimum.

A still further object is to provide an improved sulky-rake which will dump its load automatically by the spring of the teeth and also make provision for improved means to neutralize the desired portion of the natural gravitation of the rake-teeth to assist the revolution of the spring rake-teeth and dumping of the load therefrom.

Other objects are the provision of a novel axle construction and an improved form of locking and unlocking mechanism for the spring rake-teeth whereby the rake is automatically locked after dumping and by means of which in the action of dumping the natural spring of the teeth is assisted to facilitate dumping.

Having the foregoing objects in view, the invention consists of a sulky hay-rake comprising certain improved features and novel combinations and adaptations of parts set forth in detail hereinafter and recited in the appended claims.

In the accompanying drawings, Figure 1 is a perspective view of the complete sulky hay-rake; Fig. 2, a plan view; Fig. 3, a vertical section taken on line $x x$ of Fig. 2; Fig. 4, an enlarged detail perspective view of the locking and unlocking lever mechanism; Fig. 5, an enlarged detail perspective view of the trip or unlocking lever; Fig. 6, an enlarged detail sectional view taken through the lock-pin, showing the locking-lever in position; Fig. 7, a detail end view of locking and unlocking lever mechanism; Fig. 8, an enlarged detail perspective sectional view of the axle or rake-head, showing the radial lock-arm; Fig. 9, a detail of the end of the lock-lever adapted for engagement with the lock-arm; Fig. 10, an enlarged detail sectional view through the axle or rake-head, showing axle-ring and spool-roller; Fig. 11, an enlarged detail sectional view through the axle or rake-head, showing ring-yoke; and Fig. 12, a front view of the neck-yoke.

The axle 5, which is also the rake-head, is of angle-iron and provided at its ends with suitable spindles for the wheels 12. To the angle-iron axle or rake-head are secured the overhanging or curved spring-teeth 13. Secured on the rake-head or axle 5 are the axle-rings 9.

The numeral 7 designates the angle-iron machine-frame carrying at its front the driver's seat 18 and at its rear ends the ring-yokes 6, which encircle the rings 9 and afford a bearing for the latter to turn in. No ring-yoke is provided for the intermediate ring 9, but the draft-pole 8 is extended rearwardly under the front of the frame and upwardly in horizontal position and provided at its rear end with a fork, in which is journaled an antifriction-roller 10, which bears on the ring 9, thus supporting the front portion of the frame 7.

A cleaner comprising arms 15 at the ends thereof and an intermediate arm 15, which latter passes under the lower side of ring 9, arms 14, secured to the ring-yokes 6, and a bar 16. The cleaner is adapted to insure the removal of all the hay that does not dump by gravity during the dumping operation by skimming it from the spring rake-teeth 13.

Secured to the rake-head or axle 5 are rigid weighted counterbalancing-arms 17. These arms extend forwardly on the opposite side of the axle from the rake-teeth and they are of sufficient weight to neutralize the desired portion of the natural gravitation of the spring rake-teeth, so that upon the release of the spring rake-teeth by the locking and unlocking mechanism and the automatic upward spring of the rake-teeth by their inherent resiliency said teeth are assisted to rise and make a complete revolution, assisted by the natural manual pressure exerted by the driver in unlocking the rake-teeth, as will hereinafter fully appear.

The pole 8 is suitably braced by the braces 19 in order to insure the rigidity thereof. At the forward end of the pole 8 there is a neck-yoke 22, having the limit-rods 23 secured thereto at its ends, in which play the slide-rings of the neck-yoke.

Connected to the corners of the frame 7 are rigid arms 20', to which are attached singletrees 20. The draft apparatus thus provided by the singletrees and neck-yoke having sliding harness connections absolutely prevents all side pressure or strain on the pole in turning the machine when loaded and brings the draft directly on the frame and rake-head. In draft apparatus as heretofore employed on sulky hay-rakes the tendency has been to side strains and pressure when the machine was being turned around, which soon racked the machine and eventually disabled it. With my improved draft apparatus, wherein no doubletree is employed, there is no side pressure or strain whatever in turning or at any other time.

Secured to the frame 7 is a bar 37, possessing a certain degree of resiliency. To the rear end of this bar is pivoted a vertical lever 26, and to its front end is pivoted a vertical foot-lever 27, said levers being pivoted to and supporting a lock-lever 24, having at its rear end a notch 24' and incline 25', the latter adapted to ride on and the former to receive the horizontal portion or arm of a lock-arm 25, secured to axle or rake-head 5, when the rake-teeth are in position for raking. The foot-lever 27 has a foot-pin 29 projecting laterally therefrom in convenient position for manipulation by the driver's foot.

The numeral 34 designates a lock-bar pivoted at one end to the lever 27 and having a notch which is adapted to receive a lock-pin 36 on a bracket 35, secured to the frame 7. Beneath this lock-bar is a trip-bar 33, having its free end provided with a right-angular portion adapted for engagement with the lock-bar 34. The trip-bar 33 is rigidly connected to a trip-lever 28 by the connection 33', which extends through the foot-lever 27 and pivots the trip-bar and trip-lever thereto on opposite sides thereof. Said trip-lever has a trip-pin 30 located adjacent and somewhat above the foot-pin 29.

A leaf-spring 32 has one end secured to the frame 7 and its free end extending forwardly and turned upwardly in position to engage a pin 31 on the trip-lever 28.

The operation: When ready to dump the load, the driver presses with his foot on foot-pin 30, which elevates trip-bar 33, disengaging lock-bar 34 from lock-pin 36, whereupon the rake-head is immediately unlocked. The spring energy stored in the spring rake-teeth by reason of the tension caused by the draft necessary to gather the load immediately revolves the rake-teeth and dumps the load when unlocked, as before described. The driver continues to press forward with his foot on the foot-pin 29 until the pin 31 presses the spring 32 down to the position shown by dotted lines in Fig. 3 and then removes his foot laterally from the foot-pins. The locking and unlocking mechanism is then automatically returned to normal position by the recoil of the spring. Meanwhile the rake-head, spring-teeth, and weighted or counterbalancing arms have obtained sufficient momentum by the spring from the rake-teeth temporarily supplemented by the pressure of the driver's foot exerted through the rear shoulder of notch 24' and lever 24 and lock-arm 25 to turn a complete revolution without restriction, whereupon the lateral arm 25 rides under the beveled end 25' of bar 24 and snaps into the notch 24', and the rake-teeth are then locked in position to gather the next load.

It will be observed that the weighted counterbalancing-arms not only assist the rise of the rake-teeth when released to dump the load, but they also prevent the teeth from dropping heavily or thrashing on the ground when the rake-teeth are assuming normal position after turning a complete revolution.

Another very advantageous feature is the utilization of the pressure of the driver's foot to give the rake-teeth momentum just as released to turn over.

Having thus described my invention, what I claim as new, and desire to secure by Letters Patent, is—

1. In a sulky hay-rake, the combination with the machine-frame, of an angle-iron rake-head, rake-teeth secured thereto, rings on the angle-iron rake-head, and ring-yokes on the machine-frame in which the rings are adapted to turn a complete revolution, whereby the rake is rendered adaptable for turning a complete revolution.

2. In a sulky hay-rake, the combination with an open machine-frame, of a rake-head journaled therein, rake-teeth secured to the rake-head, a ring on the rake-head, and a bracing member secured to the forward portion of the frame and located in the open portion thereof having an antifriction-roller bearing on the ring.

3. In a sulky hay-rake, the combination with an angle-iron rake-head and rake-teeth secured thereto, of rings secured on the rake-head, a machine-frame having ring-yokes in which certain of the rings are journaled to turn a complete revolution, and a bracing member secured to the frame and provided with an antifriction-roller bearing on another of the rings.

4. In a sulky hay-rake, the combination with a revolubly-mounted rake-head and spring rake-teeth connected thereto adapted for a complete and unrestricted revolution to dump the load, of a counterbalancing device positively connected to the rake-head and operatively coacting therewith at all times, said counterbalancing device being adapted to neutralize the desired portion of the natural gravitation of the rake-teeth and assist them to make the complete revolution and also to prevent the rake-teeth from falling heavily on the ground.

5. In a sulky hay-rake, the combination with a revolubly-mounted rake-head and spring rake-teeth connected thereto adapted for a complete and unrestricted revolution to dump the load, of weighted counterbalancing-arms rigidly connected to the rake-head which are adapted to neutralize the desired portion of the natural gravitation of the rake-teeth and assist them to make the complete revolution and also to prevent the rake-teeth from falling heavily on the ground.

6. In a sulky hay-rake, the combination with a revolubly-mounted rake-head and spring rake-teeth connected thereto adapted for a complete and unrestricted revolution to dump the load, of means for locking the rake-head in normal position, and means for manually imparting momentum to the rake head and teeth as the rake-head is being released, whereby the rotation of the rake-teeth past the position of unstable equilibrium is facilitated.

7. In a sulky hay-rake, the combination with a revolubly-mounted rake-head and spring rake-teeth connected thereto adapted for a complete and unrestricted revolution to dump the load, of a movable lock-lever adapted to lock the rake-head in normal position, a foot-lever for manipulating said lock-lever, and connections whereby when said lock-lever is manipulated by the foot-lever, it is adapted to assist the rotation of the rake-teeth past the position of unstable equilibrium on the unlocking thereof for their revolution.

8. In a sulky hay-rake, a locking and unlocking mechanism comprising the combination with a movable lock-lever, of a foot-lever pivoted thereto, means for locking said lever, a trip-lever having means for unlocking the locking mechanism for the first-named foot-lever, and a spring for returning the parts to normal position.

9. In a sulky hay-rake, a locking and unlocking mechanism comprising the combination with a movable lock-lever, of a foot-lever pivoted thereto, a notched lock-bar connected thereto, a lock-pin adapted to engage said notch, a trip-lever and trip-bar connected together and pivoted to the foot-lever, said trip-bar being adapted to disengage the lock-bar from the pin, and a spring for returning the parts to normal position.

10. In a sulky hay-rake, the combination with the axle or rake-head, rake-frame, and a lock-arm on the rake-head, of a longitudinally-movable rigid lock-lever whose rear end engages the lock-arm and means for rigidly securing the front end of the lever, whereby the rake-head is rigidly locked when the rake-teeth are gathering the load.

In testimony whereof I hereunto affix my signature in presence of two subscribing witnesses.

AMOS R. BLACK.

Witnesses:
 GEO. R. HAMLIN,
 FRANK E. NEWTON.